United States Patent
Shapira et al.

(10) Patent No.: US 10,484,545 B2
(45) Date of Patent: Nov. 19, 2019

(54) METHOD FOR OPTIMIZING QUALITY OF EXPERIENCE IN MIXED MANAGED AND UNMANAGED NETWORK ENVIRONMENTS WITH GOVERNANCE AND REGULATION CONSTRAINTS

(71) Applicant: TELEMESSAGE, Petach-Tikva (IL)

(72) Inventors: Gil Shapira, Herzliya (IL); Guy Levit, Ramat Hasharon (IL)

(73) Assignee: TELEMESSAGE, Petach-Tikva (IL)

( * ) Notice: Subject to any disclaimer, the term of this patent is extended or adjusted under 35 U.S.C. 154(b) by 60 days.

(21) Appl. No.: 15/228,348

(22) Filed: Aug. 4, 2016

(65) Prior Publication Data
US 2018/0041641 A1    Feb. 8, 2018

(51) Int. Cl.
| | |
|---|---|
| *H04M 7/00* | (2006.01) |
| *H04L 29/06* | (2006.01) |
| *H04M 3/42* | (2006.01) |
| *H04L 29/08* | (2006.01) |

(52) U.S. Cl.
CPC .......... *H04M 7/0078* (2013.01); *H04L 65/80* (2013.01); *H04L 67/10* (2013.01); *H04L 67/14* (2013.01); *H04M 3/42229* (2013.01); *H04M 3/42221* (2013.01); *H04M 2203/158* (2013.01); *H04M 2203/551* (2013.01)

(58) Field of Classification Search
CPC .......... H04M 7/0078; H04M 3/42221; H04M 3/42229; H04M 2203/158; H04M 2203/551; H04L 65/80; H04L 67/10; H04L 67/14
See application file for complete search history.

(56) References Cited

U.S. PATENT DOCUMENTS

| | | | | |
|---|---|---|---|---|
| 6,760,324 B1* | 7/2004 | Scott | ...................... | H04L 45/02 370/352 |
| 6,785,229 B1* | 8/2004 | McNiff | .................. | H04L 12/66 370/230 |
| 7,362,698 B2* | 4/2008 | Christensen | ...... | H04L 29/06027 370/217 |
| 8,213,587 B2* | 7/2012 | Vendrow | ................. | H04M 3/02 379/201.01 |
| 8,228,902 B2* | 7/2012 | Mehmood | ........... | H04M 3/5232 370/353 |
| 8,412,847 B2* | 4/2013 | Longo | ............... | H04L 29/12056 707/770 |
| 8,442,205 B2* | 5/2013 | Kaushal | ................. | H04L 65/00 370/352 |

(Continued)

*Primary Examiner* — Asad M Nawaz
*Assistant Examiner* — Thomas R Cairns
(74) *Attorney, Agent, or Firm* — Browdy and Neimark, P.L.L.C.

(57) ABSTRACT

A method and system are provided for routing a call initiated by a member of an organization having communication servers for handling the call routing, wherein the organization communication servers are located at different geographical areas. Media routing decisions are made within a distributed communications system that spans both managed and unmanaged networks, while taking into account a large set of input metrics. The method and system optimize the call routing for quality of experience while maintaining restrictions posed by companies and organizations that need to adhere to strict policies, either internal or external, such as governance and regulation.

27 Claims, 8 Drawing Sheets

(56) References Cited

U.S. PATENT DOCUMENTS

| | | | |
|---|---|---|---|
| 8,818,344 B2* | 8/2014 | Forbes | H04W 76/10 |
| | | | 455/415 |
| 9,276,903 B2* | 3/2016 | Halbraich | H04L 63/00 |
| 9,363,368 B2* | 6/2016 | Pearce | H04M 3/42221 |

* cited by examiner

METHOD FOR OPTIMIZING QUALITY OF EXPERIENCE IN MIXED MANAGED AND UNMANAGED NETWORK ENVIRONMENTS WITH GOVERNANCE AND REGULATION CONSTRAINTS

BACKGROUND OF THE INVENTION

In the domain of WebRTC, there are many solutions developed in cloud environments. The main concern and consideration in these solutions is for optimizing for call quality, and routing media through the closest media relay points (closest being based on network topology and not necessarily geographically). In regulated industries or enterprises seeking higher security levels, compliance with regulations and corporate governance, the approach of existing solutions optimizing the call quality is not sufficient.

Existing solutions fail to consider scenarios where the speakers' call must be recorded and stored at a specific location or country, or when the sensitivity or context of the call needs to be governed or analyzed for specific content.

To that end, we have invented a new algorithm designed to work for routing media where more complex decision processes need to be used regarding relay and routing points. These decision processes need to take into consideration data retention, governance, regulation and call quality—as well as other aspects of the call.

BRIEF SUMMARY OF THE INVENTION

The present invention is an algorithm that makes a decision on the best way to connect a chat, voice or video call between two or more users in a communication system. The "best way" is dependent on multiple variables, such as the users' locations, each users' role, the device's characteristics, the location of the offices and other characteristics that relate to the geography, location, regulations, types of users that participate in the communication, the method of communication, connectivity bearer, device and enterprise and other corporate settings.

The invention ensures calls adhere to the legal environment, compliance, corporate governance and regulations in which they must operate, while maintaining a high level of user experience and serviceability to the users of the communication system.

The present invention provides a method for routing a call initiated by at least one member of an organization having communication servers for handling the call routing, wherein the organization communication servers are located at different geographical areas. The method comprising the steps of:
  receiving a call request with metadata of a requesting device and a requesting member;
  identifying a geographical and logical location of the requesting member and a call destination based on the received metadata;
  authorizing a call based on the determined location and metadata by applying an organization policy; and
  determining a call routing method based on the location data and metadata by applying pre-defined organization policy rules.

According to some embodiments of the present invention, the call routing method is at least one of: local routing using single network server, non-local routing using more than one designated server or P2P call routing.

According to some embodiments of the present invention, determining the call routing includes determining routing path based call session quality parameters.

According to some embodiments of the present invention, determining the call routing includes determining the call type According to some embodiments of the present invention, the quality parameters are tested using organization servers or cloud servers (consulting with peer offices/cloud servers).

According to some embodiments of the present invention, the method further comprising the step of determining additional actions including at least one of: monitoring, recording or encrypting of a call session by at least one designated network server.

According to some embodiments of the present invention, the metadata includes at least one of: requesting a user profile, requesting user device characteristics, a connectivity profile or network quality.

According to some embodiments of the present invention, the location identification is based on retrieving data of past interactions of user requests in a short time period, in case of identifying the call request as a continuation of a previous call maintaining the same routing method and path.

According to some embodiments of the present invention, in case of local routing, the routing is based on office location using a single network sever.

According to some embodiments of the present invention, in case of non-local routing, the routing is based on user location using more than one network server.

The present invention provides a system for routing a call initiated by at least one user of an organization having at least two communication server for handling the call routing, wherein the organization's communication servers are located at different geographical areas. The system is comprised of:
  a location identifying module for identifying geographical and logical locations of a requesting member based on received metadata;
  an authorizing module for authorizing a call based on the determined locations and metadata by applying organization policy; and
  a routing decision module for determining a call routing method based on the location data and the metadata by applying pre-defined organization policy rules.

According to some embodiments of the present invention, the call routing method is at least one of: local routing using a single designated network server, non-local routing using more than one server or P2P call routing.

According to some embodiments of the present invention, determining call routing includes determining routing path based call session quality parameters.

According to some embodiments of the present invention, determining call routing includes determining a call type.

According to some embodiments of the present invention, the quality parameters are tested using organization servers or cloud servers (consulting with peer offices/cloud servers).

According to some embodiments of the present invention, the routing decision module further determines actions to be taken in relation to the call including at least one of: monitoring, recording or encrypting of the call session by at least one network server.

According to some embodiments of the present invention, the location identification is based on retrieving data of past interactions of the user requests in a short time period, when it is detected that the new call request is a continuation of a previous call maintaining the same routing method and path.

According to some embodiments of the present invention, in case of local routing, the routing is based on office location using a single network sever.

According to some embodiments of the present invention, in case of non local routing, the routing is based on user location using more than one network server.

DETAILED DESCRIPTION AND BEST MODE OF IMPLEMENTATION

Figure 1:
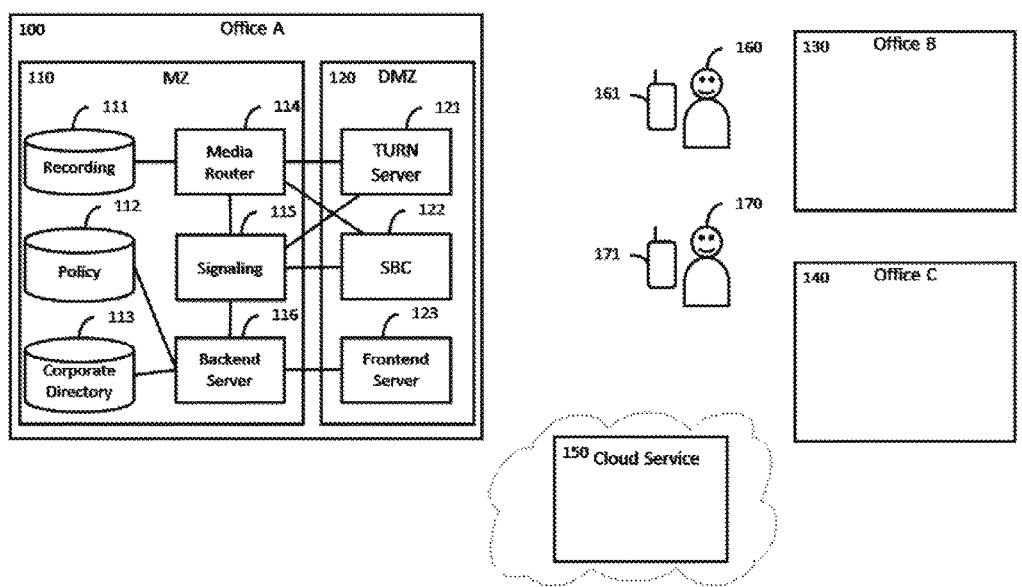
FIG. 1 illustrates the system entities that play a role according to some embodiments of the present invention.

FIG. 1 illustrates the system entities that play a role according to some embodiments of the present invention. The system entity comprises one or more offices, belonging to an organization, an optional external cloud service and users who connect to each other via devices.

The present invention is implemented in the environment of an organization, having a distributed communication system. This communication system is built out of one or more offices 100, 130, 140, along with an optional external cloud service 150.

According to some embodiments of the present invention, an office may include different network zones, such as: a MZ (militarized zone) 110, where machines and servers are not exposed directly to an external network; and a DMZ (demilitarized zone) 120, where machines and servers are located at a perimeter network of the office, exposed to external untrusted networks.

In the DMZ 120, there can be one of more Frontend Servers 123. These servers take care of connecting the signals from devices 161, 171 located outside the office network into the servers located in the MZ 110.

In the DMZ 120, there can optionally be an SBC (Session Border Controller) 122, in charge of connecting all media and VoIP (Voice over IP) signaling from outside the office network into the office VoIP servers. SBCs are mainly used as security and interoperability mechanisms.

In the DMZ 120, there can optionally be one or more TURN servers 121. These servers are used to relay media traffic coming from WebRTC, SIP or any other protocols that make use of STUN or TURN IETF specifications. These servers ensure that media can be sent between the various users of the communication system without getting blocked by firewalls or NATs (Network Address Translators).

In the MZ 110, there is at least one Backend Server 116. These servers take care of the core logic of the communication system, taking into account the authorized users who can make use of the communication system by working in concert with a Corporate Directory 113 and a Policy database 112, where all policy related rules and directives are stored. The Backend Server 116 also communicates with the Signaling server 115, directing it on the decisions made, effectively enforcing the policies desired by the organization.

In the MZ 110, there is at least one Signaling servers 115. These servers implement a known signaling protocol used across the communication system to communicate signals between devices and servers. This signaling protocol can be a standard based protocol such as SIP or XMPP, a proprietary protocol or a combination of protocols. The Signaling server communicates with the SBC 122, or directly with the devices 161, 171 when the devices are located within the local network (the MZ 110) or when an SBC 122 doesn't exist or isn't necessary for the specific communication session. The Signaling server 115 also communicates with the TURN Server 121 and the Media Router 114, directing them on how to operate for each and every communication session in which they engage.

In the MZ 110, there is at least one Media Router 114. These routers are in charge of opening any encryption and privacy mechanisms that are used to send the media over the network, as well as closing the encryption and privacy mechanisms when routing the media to other participants in the communication session. The Media Router 114 is considered a trusted entity in the system when it comes to the media, with the ability to listen in to the voice, video and any other rich content sent in the communication session. The Media Router 114 may communicate with an external real time media system such as a Recording server 111, which is used to store or further process and analyze the media. An example of this other server can be a DPI (deep packet inspection) mechanism that analyzes the conversation and 1) tracks files delivered or certain keywords and phrases; 2) examines the video session, searching for specific artifacts and elements; 3) analyzes the conversation's tone or sentiment; etc.

Within an Office 100, the various server components can be merged to comprise fewer physical machines offering similar logical functions. Further, the various server components can be further split into smaller functional units that together comprise similar logical functions.

Within an Office 100, some of the servers and functions depicted can be disabled and removed from the architecture when the specific function is not needed. Recording 111, for example, is not mandated or required by some organizations.

There can be one or more Offices 100, 130, 140 that can be deployed as part of the communication network. There is no limit to the number of such offices. They have an internal architecture that is similar to the depiction of Office A 100. The offices may be located at different geographical areas and related to different parts of the organization.

An optional Cloud Service 150 can also be used. It has an architecture that is similar to the depiction of Office A 100, though it can be further distributed geographically as well as offer multi tenancy for several companies. The Cloud Service acts as another access point into the communication service that augments and optimizes the on-premises communication service of the company or companies.

The invention enables communication between the Users 160, 170 who access the communication network. These users can be humans or automated machines. They connect to the network and communicate with other Users 160, 170 through the use of Devices 161, 171. These Devices 161, 171 can be smartphones, tablets, laptops, computers, Internet of Things devices, wearables or any other computational device capable of network connectivity. The users may be located at different geographical areas and belong to different entities of the organization. Each entity of the organization may have different policies for routing.

Figure 3:
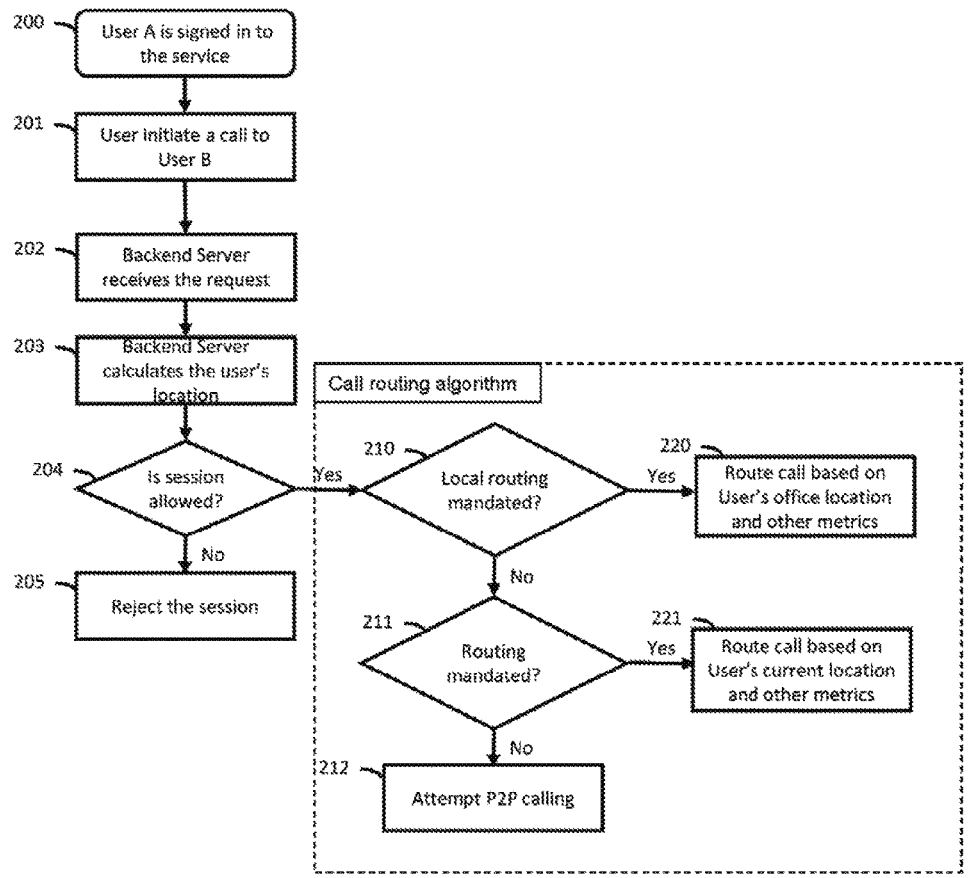
FIG. 3 illustrates the algorithm flow for call session initiation according to some embodiments of the present invention.

FIG. 3 illustrates the algorithm flow for call session initiation according to some embodiments of the present invention. It depicts how the Backend Server decides on the best routing strategy for each session dynamically based on multiple metrics and policies.

When User A 160 wishes to connect to the communication system, he registers with it, as depicted in 200. This can take place by any means of communications—standards based or proprietary. It can take the form of a SIP REGISTER message, a social network connect procedure, OAuth transaction or any other alternative.

When User A 160 wishes to communicate with User B 170, he signals the Backend Server 116 about his intent, as depicted in 201. This can take the form of any means of communications—standards based or proprietary. It can take the form of a SIP INVITE message or any other alternative. User B 170 can be a single user or multiple users in a group session or a group conference.

When User A 160 reaches out to User B 170 via call initiation 201, it does so via the user's Device 161, notifying it of its intent and the destination of User B 170. The Device can add to this initiation request additional metadata to be used for call routing decisions. This additional metadata may or may not prompt User A 160 for his approval. The additional metadata may include the Device 161 location, based on its IP address, GPS coordinates, WiFi and cellular triangulation or other means of pinpointing the device. Additional metadata may include Device 161 characteristics, such as model, make, CPU performance, memory, storage capacity, screen resolution or other characteristics. Additional metadata may include Device 161 network information, such as its user role, its connectivity profile, network quality or any other information that is deemed useful to making a decision. The additional metadata may include other types of information that may be needed for the policy decision making algorithm to make a more informed routing decision.

In 202, the Backend Server 116 receives the request along with the metadata from User A's Device 161. The message can be a single one, or multiple consecutive or parallel messages, and can be sent in any digital means. It can be sent directly to the Backend Server 116 or traverse through the Frontend Server 123 to ensure the network security policies in the organization are followed. Once the request is received and authenticated by the Backend Server 116, it will initiate the algorithm to determine the best route to connect User A 160 to User B 170.

In 203, the Backend Server 116 calculates the location of User A 160. It does so by analyzing the network address of his Device 161, along with any supporting metadata and information sent by User A 160 in his request or in previous requests. The calculation of the user's location will try to pinpoint the user's location geographically as well as find out its network location—inside the corporate managed network or outside of the corporate network, and the specific corporate Office 100 location. It then calculates the location of User B 170 by any information it has on User B 170 from past interactions or registration information sent by User B 170 to the Backend Server 116 or the Signaling Server 115.

In 204, the Backend Server 116 checks if the session requested by User A 160 is allowed. This can be based on User A 160 and User B 170 role, or other policies of the organization. For example, User A 160 may not be allowed to communicate with people external to the organization, or may not be allowed to communicate with people from other teams or with his superiors, or may not be allowed to make video calls while still being allowed to make voice calls. Furthermore, this can be based on the user's location. For example, User A 160 may not be allowed to communicate with people while roaming outside of the corporate Office 100 or while traveling to certain countries.

In 204, if the Backend Server 116 determines that the call is not allowed, it will reject the session in 205 and notify User A 160 via its Device 161. This rejection and the test for session validity can take place later on in the algorithm as well, once more information about the session becomes available to the Backend Server 116.

In 210, after the Backend Server 116 decides that this session is allowed in 204, the Backend Server 116 further checks if local routing of the media is mandated which required routing the call through at least one designated communication/switching server. Such a routing policy may be forced due to various factors such as governance, regulation, session participants, recording and analysis requirements, etc.

The routing policy in 210 can decide to force routing 220 if the call is conducted to a customer or a partner for example (a non-employee), or if the role or position of User A 160 in the company is such that requires media routing. It may further decide to route the session (or not route it) if the specific media types (voice/video/other data) mandate such routing. It may further decide to route the session (or not route it) if the user is located inside a company Office premises be it Office A 100, Office B 130, Office C 140, some other office or connected via secured VPN. It can further decide to route the session (or not route it) based on the location of User A 160's Device 161, his Office A 100 and the regulatory or policy restriction of that location versus his office location. It may further decide to route the session if the session must be recorded (or further processed) via Recording Server 111.

The routing policy in 210 is configurable and stored in the Policy database 112. It is accessed by the Backend Server 116 whenever a routing decision is made. The routing policy can be cached locally by the Backend Server 116 to improve performance by learning the optimal routing path in different call scenarios.

If the Backend Server 116 decides in 210 that the session mandates local routing, then in 220, the Backend Server 116 will instruct the Signaling Server 115 (designated network server) to prepare for routing the call locally. The Signaling Server 115 will authorize the Media Router 114, TURN server 121 and/or SBC 122 to allow the session to take place. The Signaling Server 115 will further prepare additional backend components such as Recording 111 to accept and process this session as needed.

If the Backend Server 116 decides in 210 that the session does not mandate local routing, then it goes on to decide if the session needs to be routed at all in 211.

In 211, the Backend Server 116 decides if the call must still be routed. This decision is based on routing policy as well as the session's requirements. The decision making process of 211 follows similar policy steps on currently available metadata outlined above.

If the Backend Server 116 decides in 211 that the session mandates routing in nonlocal route, then the Backend Server 116 will move to 221 in order to consult with its peers in other offices (B 130, C 140 or additional offices known and available to it) on the best suitable office from which to relay the media. Backend Server 116 may also consult with a Cloud Service 150 in the same way that it would treat another office, assuming it is allowed by its own internal policies. The decision process taken here on the most suitable office to route the call through will take place into account the user's Device 161 location, as well as the location and routing policies known for the other participants in the session (if they are known).

If the Backend Server 116 decides in 211 that routing the session isn't mandated (not requiring a designated server in the call route), then it would continue to 212 and attempt peer-to-peer (P2P) calling for this session, basing the decision on the user's location. To do that, the Backend Server 116 will consult with its peers in other offices (B 130, C 140 or additional offices known and available to it) on the best suitable office from which to provide TURN 121 services. Backend Server 116 may also utilize the Cloud Service 150 in the same way that it would treat another office, assuming it is allowed by its own internal policies. The User A 160's Device 161 will then be instructed to attempt creating a session with User B 170's Device 171 directly, with the assistance of the relevant TURN Servers 121 that were picked for this session.

Figure 2:
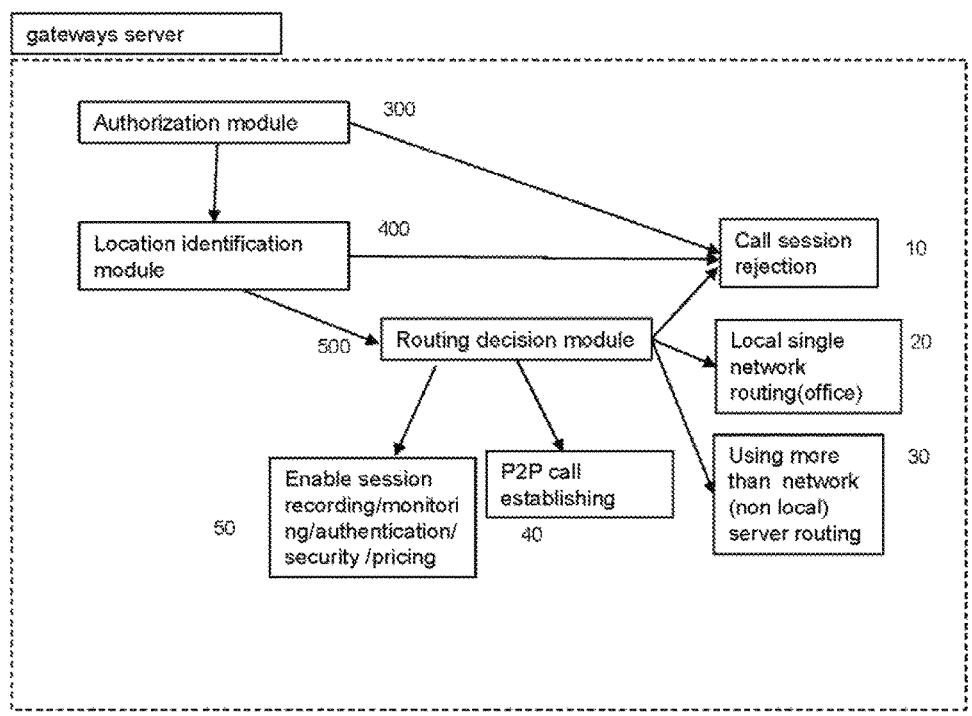
FIG. 2 illustrates the gateway server (backend server) block diagram according to some embodiments of the present invention.

FIG. 2 illustrates the gateway server (backend server) block diagram according to some embodiments of the present invention. The backend server is comprised of modules implementing the logic of call session management and routing as suggested by some embodiments of the present invention. The first module 300 analyses call request metadata at the initial stage for determining whether to authorize the call based on organization policies or to reject 10 the call session. If the call is authorized, the location identification module 400 is launched to determine the geographical and logical location of the users' devices based on call request data and previous call sessions of the users. Based on the determined location, the routing decision module 500, decides the routing method of the call, such as local call 20, nonlocal call 30 or P2P call 40, the type of the call session, and further action 50 to be applied in relation to the call session such as monitoring or recording the call session, encrypting the call or determining call pricing.

Figure 4:
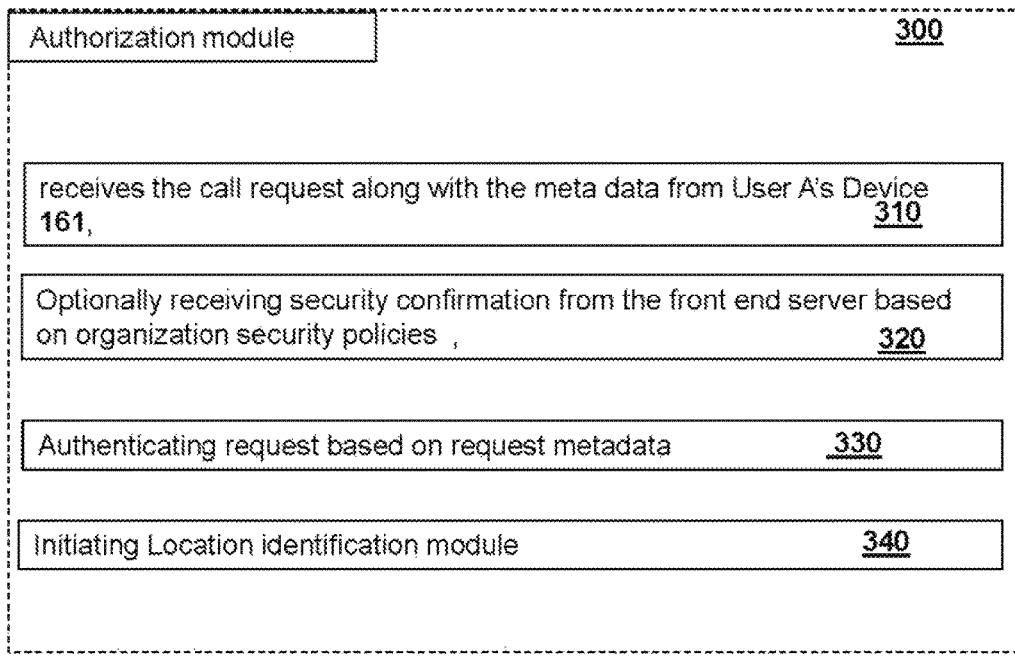
FIG. 4 is an illustration flow chart of the authorization module, according to some embodiments of the invention.

FIG. 4 is an illustration flow chart of the authorization module, according to some embodiments of the invention. The processing of the authorization module comprises the following steps: receiving the call request along with the metadata from User A's Device 161 (step 310) including identification of the destination device; optionally receiving security confirmation from the front end server based on organization security policies (step 320); authenticating request based on request metadata (step 330); and initiating the location identification module (step 340).

Figure 5:
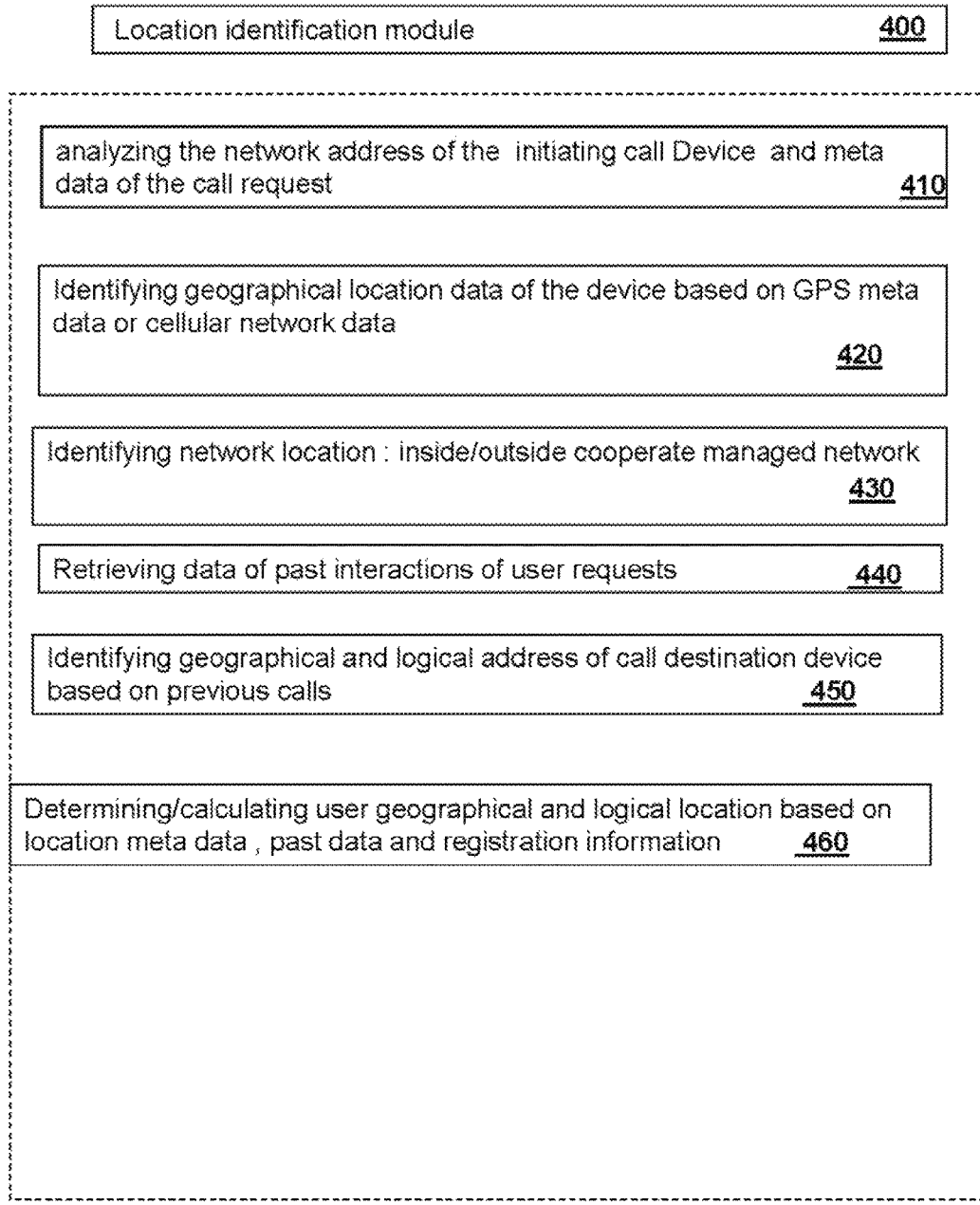
FIG. 5 is an illustration flow chart of the location identification module, according to some embodiments of the invention.

FIG. 5 is an illustration flow chart of the location identification module 400, according to some embodiments of the invention. The processing of the location module comprises the following steps: analyzing the network address of the initiating call Device and the metadata of the call request (step 410); identifying geographical location data of the device based on GPS metadata or cellular network data (step 420); identifying network location: inside/outside cooperate managed network (step 430); retrieving data of past interactions of user requests (step 440); identifying the geographical and logical address of call destination device based on previous calls (step 450), determining or calculating the user's geographical and logical locations based on location metadata, past data, the geographical and logical location of the call destination, and registration information (step 460).

Figure 6:
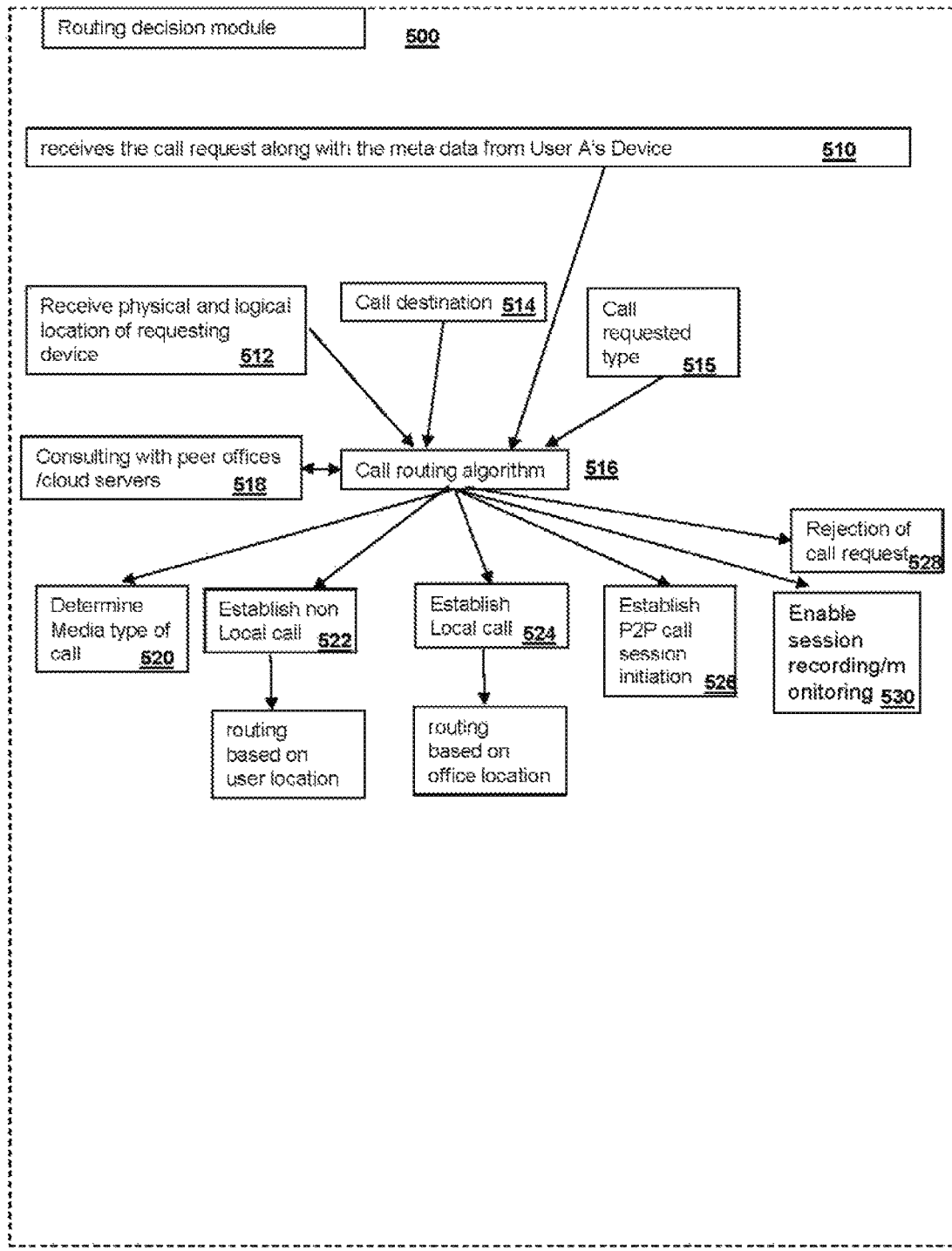
FIG. 6 is a diagram of the routing decision module, according to some embodiments of the invention.

FIG. 6 is a diagram of the routing decision module 500, according to some embodiments of the invention. The routing module receives a call requests along with metadata from User A's Device 510, and activates the call routing algorithm 516. The call routing algorithm 516 is further provided with the physical and logical location of the requesting device 512, the call destination 514, and the requested call type 515. The call routing algorithm then uses this information to determine the type of call 520 (e.g. video call, conference call etc.), to establish the local call 522 (where routing is based on user location), to establish a non local call 524 (where routing is based on office location) or to establish a P2P call session 526. Optionally the algorithm determines recording, monitoring or encrypting the call session 530 based on all the received metadata. The routing algorithm consults with the peer office or cloud sever to optimize call routing by testing different call paths. At each phase of the decision routing, the call may be rejected based on the current available metadata.

Figure 7:
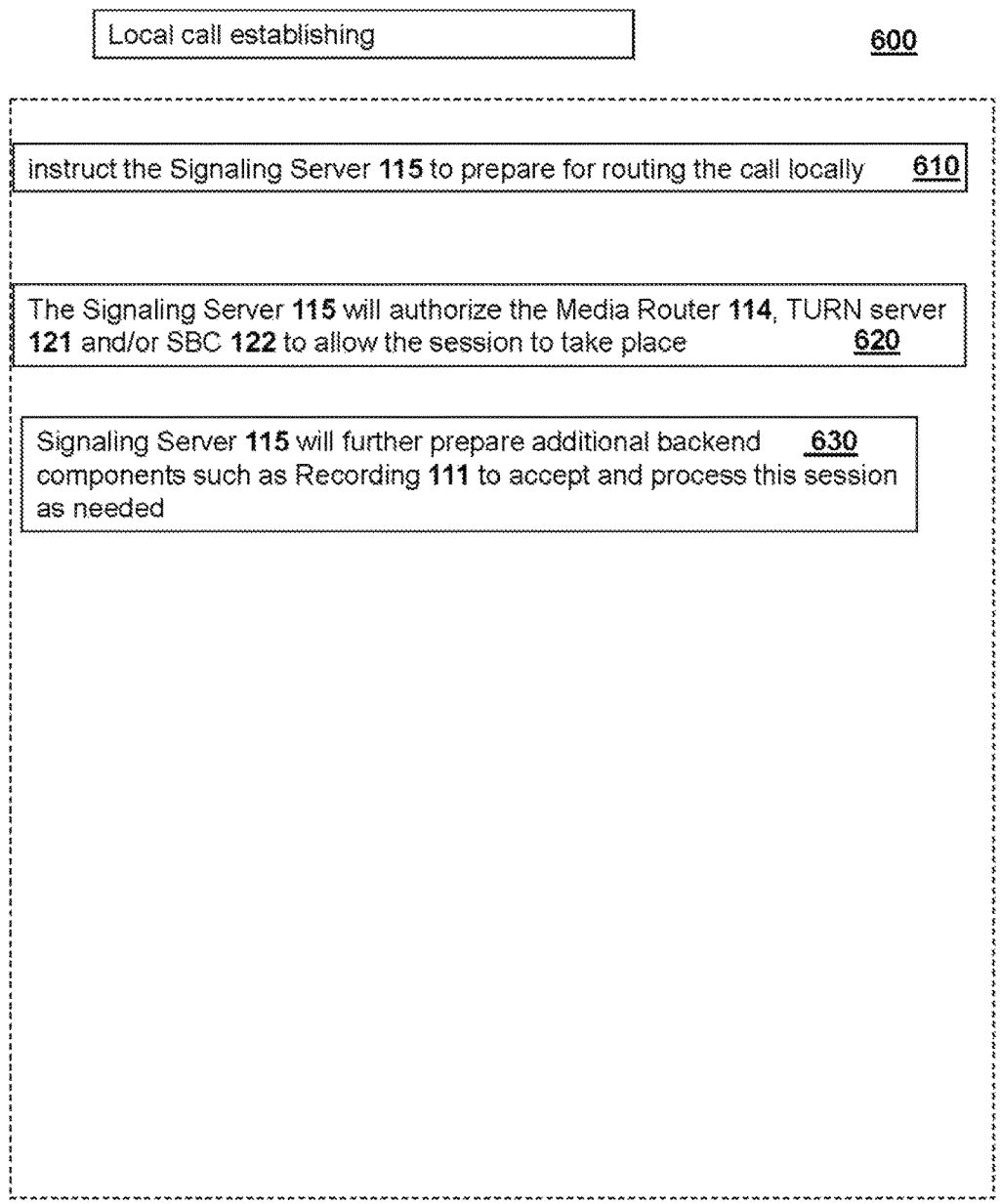
FIG. 7 is an illustration flow chart of the local call establishing module, according to some embodiments of the invention.

FIG. 7 is an illustration flow chart of the local call establishing module 600, according to some embodiments of the invention. The process of the local call establishing module 600 comprises the following steps: the signaling server 115 will be instructed to prepare for routing the call locally (step 610); the signaling server 115 will authorize the media router 114 (step 620), TURN server 121 and/or SBC 122 to allow the session to take place (step 620); and signaling server 115 will further prepare additional backend components, such as recording 111, to accept and process this session as needed (step 630).

Figure 8:
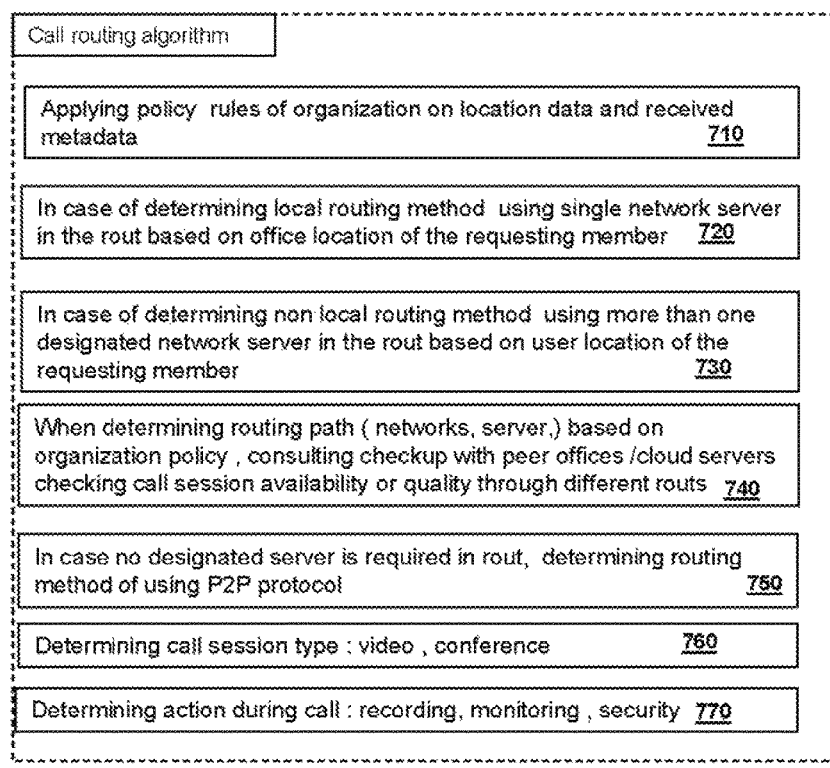
FIG. 8 is an illustration flow chart, of the routing algorithm according to some embodiments of the preset invention.

FIG. 8 is an illustration flow chart, of the routing algorithm according to some embodiments of the preset invention. The process of the routing algorithm comprises applying policy rules (step 710) of the organization on the location data and received metadata. The policy rules may define different scenarios for different user profiles, characteristics of the call device, device network information, a connectivity profile, and different offices or branches of the organization, based on the physical or the logical location of the users participating in the call, enabling the organization to apply the appropriate routing method for each scenario, ensuring optimal quality and security measurements.

In case of determining a local routing scenario, the routing algorithm further comprises determining that a single designated network server is used in the route, based on office location of the requesting user and call destination (step 720). In case of determining a routing method of nonlocal routing, the routing algorithm further comprises determining that more than one designated network server is used based on the requesting user's location of the call destination (step 730).

When determining a routing path (networks, server) based on organization policy, the routing algorithm consults with peer offices or cloud servers, checking call session availability or quality through different routes (step 740).

If no designated server is required in the route, the routing method of the P2P protocol is selected (step 750). The routing algorithm further determines the call session type, e.g., video conference (step 760) and determines additional actions during the call, e.g., recording, monitoring, or encryption (step 770).

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for routing a call initiated by at least one member of an organization having communication servers for handling the call routing, wherein the organization's communication servers are located at different geographical areas, said method comprising the steps of:

receiving a call request with metadata of a requesting device and a requesting member of the organization;

identifying a geographical and a logical location of the requesting member and a call destination to at least one participant based on the received metadata;

authorizing the requested call based on determined locations and metadata by applying organization policy; and determining a call routing method of path between the requesting member and the call destination, based on organization policy, wherein the organization policy rules define different scenarios for different user profiles, characteristics of the call device, device network information, connectivity profile for different offices or branches of the organization based on physical or logical location of users participating in the call, wherein the requesting member of the organization and the at least one participant are located at different geographical locations or belong to different entities of the organization, wherein each entity of the organization or the at least one participant has different routing rules, and wherein the routing rules are defined by roles of the requesting member and the at least one participant, such that the requesting member of the organization or at least one participant in different locations has different roles and policies which impact implementation of different routing decisions wherein the determination of call routing method include selecting between at least one of: local routing using a single network server, non-local routing using more than one designated server, and peer-to-peer (P2P) call routing wherein determining call routing path method is performed dynamically, during the call based on changes of at least one member's physical or logical location during the call.

2. The method of claim 1, wherein the call routing method is at least one of: local routing using a single network server, non-local routing using more than one designated server, and peer-to-peer (P2P) call routing.

3. The method of claim 2, wherein when local routing is mandated, the routing is based on geographical and logical locations of the requesting member using a single network sever.

4. The method of claim 2, wherein when non-local routing is mandated, the routing is based on the geographical and logical locations of the requesting member or the at least one participant using more than one network server.

5. The method of claim 1, wherein the step of determining the call routing method includes determining a routing path based on call session quality parameters.

6. The method of claim 5, wherein the call session quality parameters are tested using organization servers or cloud servers.

7. The method of claim 1, wherein the step of determining the call routing method includes determining a call type.

8. The method of claim 1, wherein the metadata includes at least one data parameter comprising at least one of: requesting a user profile, requesting user device characteristics, a connectivity profile and network quality.

9. The method of claim 1, wherein the identification of the geographical and logical locations is based on retrieving data of past interactions of user requests, when a call request is identified as a continuation of a previous call maintaining the same routing method and path.

10. The method of claim 1, further comprising:
determining to carry out a recording of the initiated call based on the geographical or logical locations of the at least one member, the geographical or logical locations of the at least one participant, or the user roles by implementing recording policy rules relating to different countries' rules;

determining the at least one server that will carry out the recording, and determining at what server to save the recording of the call session by at least one designated network server based on the policy rules.

11. The method of claim 10, wherein the recording policy rules include geographical policies and regulations relevant to the member or the at least one participant in the call.

12. The method of claim 10 wherein the recording is performed at the at least one member's device.

13. The method of claim 1, wherein determining call route method is performed dynamically, during the call based on changes of at least one member's location during the call.

14. The method of claim 1 wherein the location is determined based on additional metadata including device IP address, GPS coordinates, WiFi and cellular triangulation.

15. The method of claim 1 wherein the recording s performed at two different locations, based on different policy rules of different geographical location.

16. The method of claim 1 further comprising the step of determining additional action of recording during the call based on dynamic changes of the physical or logical location of the user.

17. The method of claim 1 further comprising the step of determining additional action of monitoring during the call based on dynamic changes of physical or logical location of the user.

18. The method of claim 1 further comprising the step of determining additional action affecting call encryption and/or decryption required for call manipulation or/and recording during the call based on dynamic changes of physical or logical location of the user.

19. A system for routing a call initiated by at least one user of an organization having communication servers for handling the call routing, wherein the organization's communication servers are located at different geographical areas, said system comprising:

a location identifying module for identifying geographical and logical locations of a requesting member and a call destination to at least one participant based on received metadata;

an authorizing module for authorizing the initiated call based on geographical and/or a logical location of the requesting member and the received metadata by applying organization policy; and a routing decision module for determining a call routing path method based on the organization's policy, wherein the organization's policy rules define different scenarios for different user profiles, characteristics of the call device, device network information, connectivity profile for different offices or branches of the organization based on physical or logical location of users participating in the call, wherein the requesting member and the at least one participant are located at different geographical locations or belong to different entities of the organization, wherein each entity of the organization or the at least one participant has different routing rules, and wherein the routing rules are defined by roles of the requesting member and the at least one participant, such that the requesting member of the organization or at least one participant in a different geographical and/or logical location has different roles and policies which impact implementation of different routing decisions, wherein the determination of call routing method include selecting between at least one of: local routing using a single network server, non-local routing using more than one designated server, and peer-to-peer (P2P) call routing;

wherein determining call routing path method is performed dynamically, during the call based on changes of at least one member's physical or logical location during the call.

20. The system of claim 19, wherein the call routing method is at least one of: local routing using single designated network server, non-local routing using more than one server, and peer-to-peer (P2P) call routing.

21. The system of claim 13, wherein when local routing is mandated, the routing is based on geographical and logical locations of the requesting member using a single network sever.

22. The system of claim 13, wherein when non local routing is mandated, the routing is based on the geographical and logical locations of the requesting member or the at least one participant using more than one network server.

23. The system of claim 19, wherein the routing decision module determines call routing by determining routing path based call session quality parameters.

24. The system of claim 23, wherein the quality parameters are tested using organization servers or cloud servers.

25. The system of claim 19, wherein the routing decision module determines call routing by determining call type.

26. The system of claim 19, wherein the routing decision module further determines actions to be taken in relation to the initiated call including at least one of: monitoring, recording and encrypting of a call session by at least one network server.

27. The system of claim 19, wherein the location identifying module identifies the geographical and logical locations based on data of past interactions of user requests, when a call request is identified as a continuation of a previous call maintaining the same routing method and path.

* * * * *